(12) United States Patent
Heinz et al.

(10) Patent No.: US 7,842,183 B2
(45) Date of Patent: Nov. 30, 2010

(54) OIL FILTER ASSEMBLY

(75) Inventors: Stefan Heinz, Bodelshausen (DE);
Friedhelm Pfitzer, Rangendingen (DE);
Peter Jungmann, Bisingen (DE);
Alexander Maute, Hechingen-Stetten (DE)

(73) Assignee: Joma-Polytec Kunststofftechnik GmbH, Bodelshausen (DE)

( * ) Notice: Subject to any disclaimer, the term of this patent is extended or adjusted under 35 U.S.C. 154(b) by 493 days.

(21) Appl. No.: 11/990,704

(22) PCT Filed: May 10, 2006

(86) PCT No.: PCT/EP2006/004383

§ 371 (c)(1),
(2), (4) Date: Feb. 20, 2008

(87) PCT Pub. No.: WO2007/022809

PCT Pub. Date: Mar. 1, 2007

(65) Prior Publication Data

US 2009/0223889 A1    Sep. 10, 2009

(30) Foreign Application Priority Data

Aug. 25, 2005  (DE) .................. 10 2005 041 041

(51) Int. Cl.
*F01M 11/03* (2006.01)
*B01D 35/157* (2006.01)
(52) U.S. Cl. .................. 210/235; 210/248; 210/441
(58) Field of Classification Search ................. 210/234, 210/235, 248, 440, 441
See application file for complete search history.

(56) References Cited

U.S. PATENT DOCUMENTS 6,896,803 B2 *  5/2005  Cline et al. .................. 210/248
7,682,508 B2 *  3/2010  Girondi ....................... 210/234

* cited by examiner

*Primary Examiner*—Terry K Cecil
(74) *Attorney, Agent, or Firm*—Paul Vincent

(57) ABSTRACT

An oil filter assembly (10) comprises a housing (12) that has a holding space for a filter element (20), which can be placed inside the housing and through which oil can radially flow, an oil inlet, an oil outlet, and a supporting tube (22), which supports the filter element. A guide (62) for a compensating body of the outlet valve is provided on a part that is separate from the housing (12). The compensating body (58) serves to compensate for axial tolerances of the housing and/or of the filter element.

14 Claims, 3 Drawing Sheets

OIL FILTER ASSEMBLY

This application is the national stage of PCT/EP2006/004383 filed on May 10, 2006 and also claims Paris Convention priority to DE 10 2005 041 041.3 filed Aug. 25, 2005.

BACKGROUND OF THE INVENTION

The invention concerns an oil filter assembly, comprising: a housing that has a holding space for a filter element, which can be placed inside the housing and through which oil can radially flow; a supporting tube which supports the filter element when the filter element is inserted, the base of the holding space having an outlet hole and the outlet hole having an outlet valve that is closed when the filter element is inserted, wherein the outlet valve comprises a compensating body that compensates for axial tolerances of the housing and/or of the filter element.

DE 44 08 888 C2 discloses a holding space base having an outlet hole with an outlet valve, which is closed when the filter element is inserted. The outlet valve comprises a compensating body (called operating body in the document) whose outer circumference is guided on the wall of the outlet duct. The compensating body compensates for axial tolerances of the housing and/or the filter element.

The outlet duct guides the compensating body in the axial direction, which enables diversion of forces acting on the compensating body in the transverse direction into the housing via the outlet duct. In particular, when inserting the filter element and screwing on the lid that closes the holding space, the filter element may become entrained by the rotary movement of the lid, thereby exerting transverse forces on the compensating body.

However, with this prior art, the configuration of the outlet valve in the outlet duct can result in accumulation of dirt and contamination in the outlet duct, which can impair the function of the compensating body and the entire outlet valve.

DE 299 20 634 U1, DE 299 22 488 U1 and DE 299 21 168 U1 all disclose a liquid filter having a check valve which is closed, when the filter is inserted, by a combination element which is axially displaceable on the housing or on the outlet of the housing.

This invention has the objective of providing an oil filter assembly that has a comparatively simple structure and ensures reliable functioning of the outlet valve.

SUMMARY OF THE INVENTION

This objective is achieved by an oil filter assembly having the features of the independent claim.

According to the invention, the supporting tube guides the compensating body and can therefore be outside and, in particular, above the base of the holding space. This has the advantage that the compensating body is filled with flowing oil from the holding space and no unwanted dirt or deposits can accumulate on the compensating body. Moreover, the compensating body is reliably protected from deflection caused by transverse forces.

Since the supporting tube comprises the guide, the oil filter module does not require an additional component. In particular, the guide is located on a foot protruding in a radially outward-facing direction or on a collar protruding in a radially outward-facing direction of the supporting tube. The guide can be structured as an opening. In particular, it may be a closed circular opening whose inner diameter is slightly larger than the outer dimensions of the compensating body.

The axial freedom of movement of the compensating body can also be limited by the supporting tube. The guide then serves as an additional retention for the compensating body in the axial direction.

According to the invention, the outlet valve can also comprise a valve body that can move between a closed position and an open position.

When the filter element is inserted, the valve body is pressed to the closed position by a first spring element and is pressed to the open position by a second spring element that is weaker than the first spring element. The compensating body is located on the valve body with freedom of axial movement and, when the filter element is inserted, is pressed against the filter element by the first spring element. Such a configuration has proven especially suitable and reliable.

Moreover, the supporting tube can be inserted in the holding space and permanently joined and/or screw-fastened to the housing. This provides substantial advantages in particular for manufacturing the oil filter assembly. In this way, the housing can be manufactured by conventional methods. In particular, the housing may be made of plastic. According to the invention, the frame-like supporting tube can be manufactured separately from the housing and inserted into the housing. Finally, the supporting tube is joined to the housing. This ensures reliable configuration of the supporting tube in which the filter element is pressed onto the supporting tube or can be removed from the supporting tube.

According to a further embodiment of the invention, the housing may incorporate fastening sections in the region of the base of the holding space and the end of the supporting tube facing the base of the holding space may incorporate fastening regions corresponding to the fastening sections. By providing the fastening sections in the region of the base of the holding space, secure positioning of the supporting tube can be achieved without impairing the radial flow of oil through the filter element and supporting tube.

According to the invention, fastening pins and pin holes corresponding to the fastening pins can be provided at the fastening sections and the fastening regions respectively. With the fastening pins and the corresponding pin holes, a permanent connection between the supporting tube and the housing can be simply achieved. The fastening pins may, for example, be constituted as rivet studs, and in particular as rivet studs for welding. After insertion of the supporting tube, the rivet studs can be riveted in such a way that a permanent joint between the supporting tube and the housing is achieved. In particular, if the housing and the supporting tube are made of plastic, hot riveting is a suitable way of achieving a permanent joint.

According to the invention, however, the fastening pins may also be constituted as latching pins. Permanent joining of the supporting tube to the housing can also be achieved by latching and, in particular, by permanent snapping in of the latching pins through the pin holes.

According to the invention, the supporting tube can also be joined to the housing by means of screw fastenings.

In a preferred embodiment of the invention, the fastening sections of the housing are constituted as webs running in the axial and/or radial direction on whose top side, facing the filter element, at least one fastening pin is located. The webs advantageously extend from the base of the holding space in the axially upward direction and form a rest for the supporting tube. When the supporting tube is inserted, this therefore rests on the top side of the webs. If rivet studs are provided, a rivet fastening between the webs and the supporting tube can be achieved. Riveting can advantageously be performed in the axially upward direction. The webs can extend over the base of the holding space in the radial direction at least in sections. This increases the rigidity of the housing.

To permit reliable fixture of the supporting tube, the fastening regions may advantageously be constituted as feet protruding radially outward or as a protruding collar that is circumferential, at least in sections. If, in the region of the base of the holding space, webs are provided with fastening pins, pin holes corresponding to the fastening pins are provided on the feet or on the collar. By providing feet or a collar, forces acting in the transverse direction on the supporting tube or on the filter element on the supporting tube can be advantageously diverted into the housing.

An advantageous embodiment of the invention also results if the supporting tube in the region of the base of the holding space surrounds a retaining tube that is closed in the radial direction and spaced radially with respect to the supporting tube. When the supporting tube is inserted, for example, this can be placed over the retaining tube. The retaining tube then serves as a joining aid.

According to an embodiment of the invention a relief-bypass valve is located on the free end of the supporting tube facing away from the base of the holding space. Such a valve is opened if a pressure limit is exceeded, for example, because the filter element has accumulated deposits of dirt.

Further details of advantageous embodiments of the invention are given in the following description by which the embodiment shown in the drawing is described and explained in more detail.

DESCRIPTION OF THE PREFERRED EMBODIMENT

Figure 1:
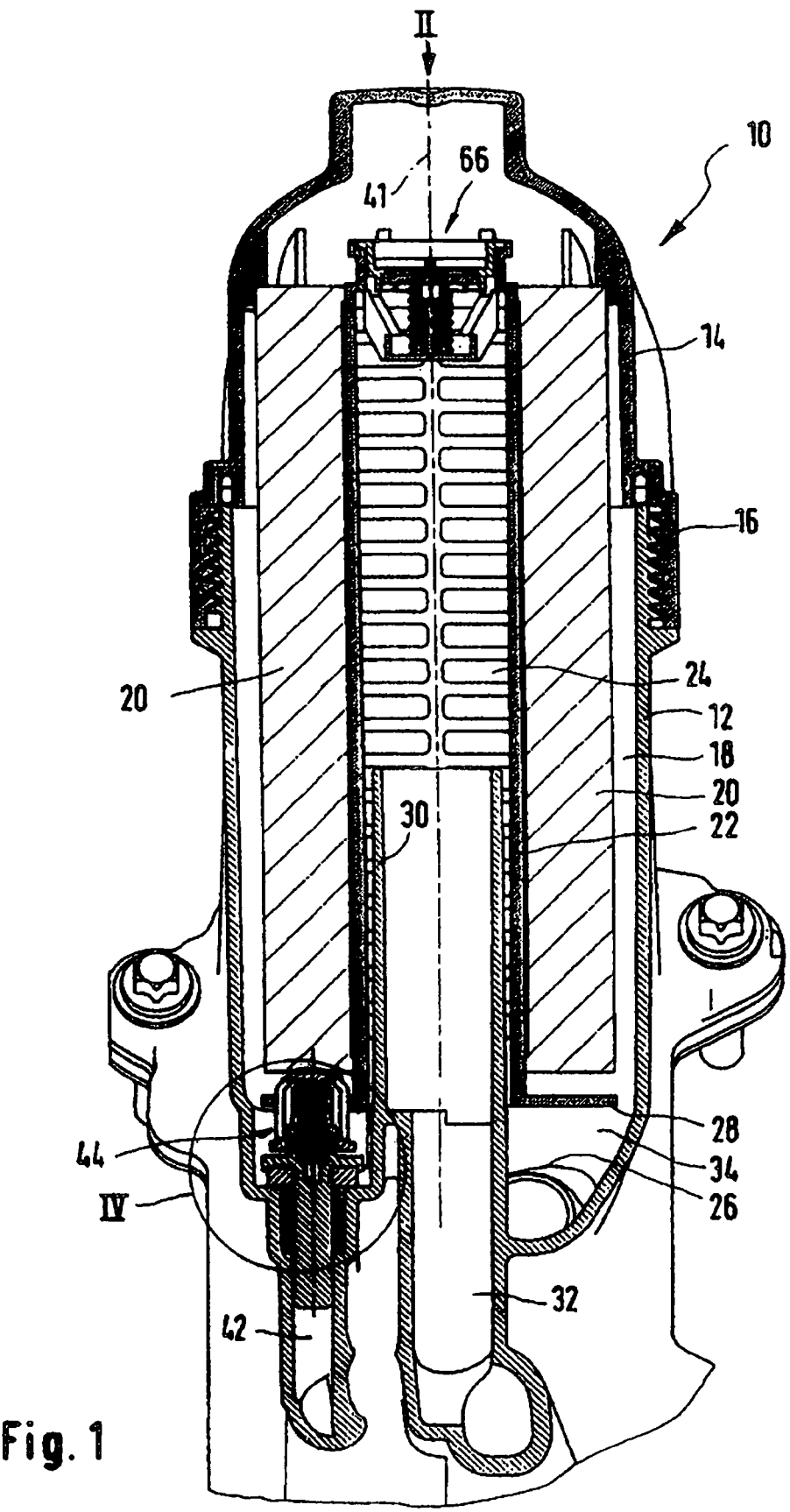
FIG. 1 a longitudinal section through an inventive oil filter assembly.

The oil filter assembly 10 shown in FIG. 1 comprises a housing 12 that can be screw-fastened to a lid 14 via a thread 16. The housing 12 and the lid 14 enclose a holding space 18, in which a filter element 20 is located through which oil can radially flow. The filter element 20 is borne by a frame-like supporting tube 22. To allow oil to flow radially through the supporting tube 22, the supporting tube contains several openings 24. The supporting tube 22 has, on its end facing the base 26 of the holding space, a circumferential ring collar 28 extending radially outward. According to the invention, instead of providing a circumferential ring collar, it is also possible to provide only sections of a ring collar or feet that extend radially outward.

The lower region of the supporting tube 22 surrounds a retaining tube 30 that is located on the base 26 of the holding space, extends axially upward and is closed in the radial direction. The retaining tube 30 opens into an oil outlet 32 for clean filtered oil. An oil inlet 34 for unclean oil that has yet to be filtered is located in the region of the base 26 of the holding space 18.

When the oil filter assembly is in use, unclean oil that has yet to be filtered flows from oil inlet 34 radially through the filter element 20 to the oil outlet 32.

Figure 2:
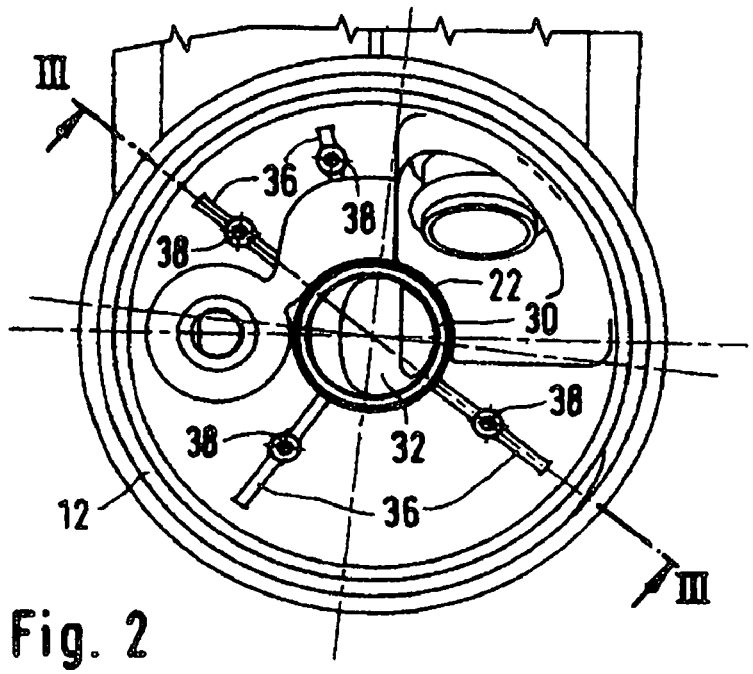
FIG. 2 a plan view according to arrow II in FIG. 1.
Figure 3:
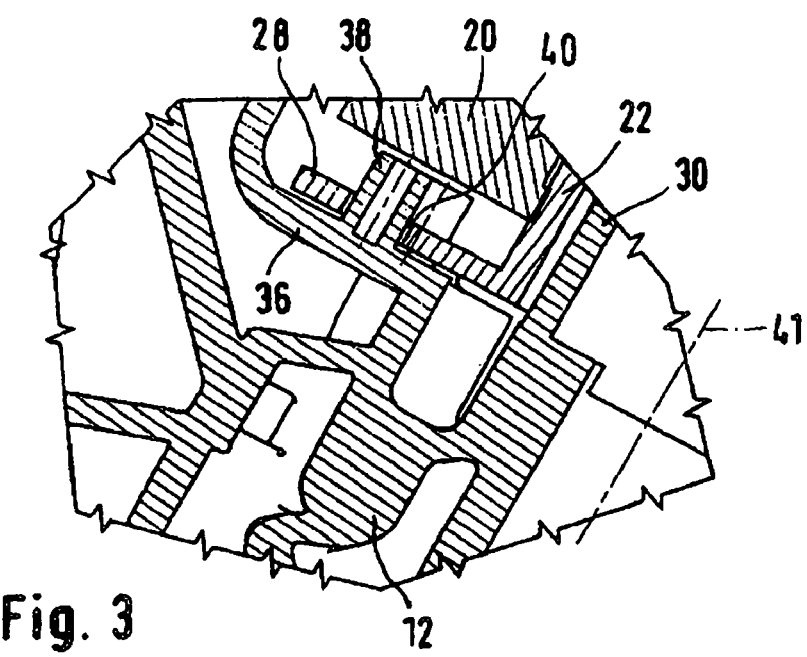
FIG. 3 a broken-out section along line III in FIG. 2.

The supporting tube 22 is inserted into the holding space 18 from above in the axial direction and is permanently fastened there. For this purpose, fastening sections 36 are provided in the region of the base 26, as shown in the plan view onto the base 26 of FIG. 2. Such a fastening section 36 is shown in detail in section in FIG. 3. FIG. 3 clearly shows that, on the top side facing the filter element 20 of the web-like fastening sections 36, a fastening pin 38 is located that is shown as a hollow rivet stud for welding in the unriveted state. The pin 38 engages in a corresponding pin hole 40 provided on the collar 28 of the supporting tube 22. The fastening pins are plastically deformed by means of hot riveting for permanent fastening of the supporting tube 22. The supporting tube 22 and the housing 12 are made of plastic. Instead of hot riveting, the pins may have internal or external threads so that the collar 28 can be fastened to the housing using nuts or screws. When the filter element 20 is not inserted, the fastening pins are accessible axially from above.

As is illustrated in FIG. 3, in particular, the top sides of the fastening sections 36 extend parallel to the collar 28 and perpendicular to the central longitudinal axis 41 of the housing 12. This results in an optimum resting surface between the fastening sections 36 and the collar 28. When the supporting tube 22 is inserted, this can be placed over the retaining tube 30 until the collar 28 finally rests on the fastening sections.

As is shown in FIG. 1 an outlet opening 42 is provided on the base 26 of the housing 12 in which an outlet valve 44 is located. When the filter element 20 is inserted, the outlet valve 44 is in the closed position.

Figure 4:
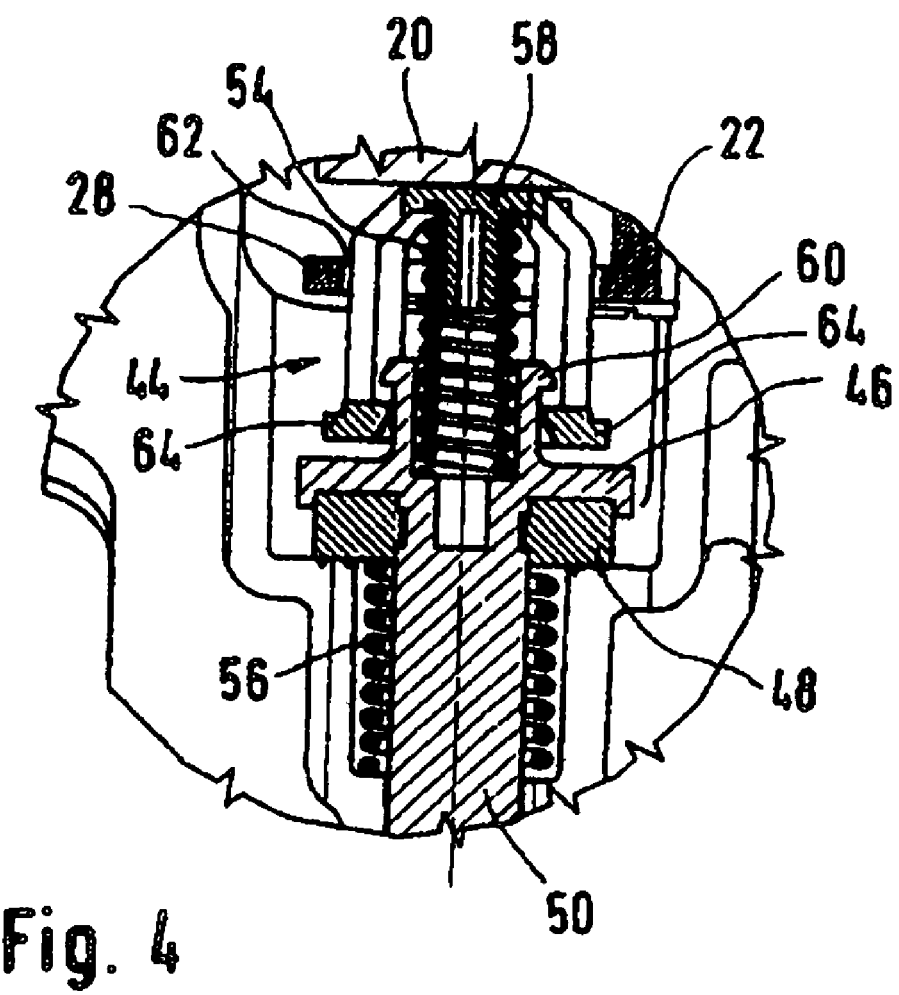
FIG. 4 a detail of region IV in FIG. 1.

As is illustrated by the detail in FIG. 4, the outlet valve 44 contains a valve body 46 that can move between a closed position and an opened position and on which an annular sealing element 48 is located. The valve body 46 contains a guide pin 50 extending in the axial direction that interacts with the guide section 52 of the outlet hole 42. The guide pin 50 can, for example, be constituted with a cross-ribbed structure in cross section, so that oil can flow along the guide pin into the outlet hole 42, or into an outlet duct.

The valve body 46 is pressed into its closed position by means of a first spring element 54. The valve body 46 is pressed into the open position by means of a second spring element 56 that is weaker than the first spring element 54. A compensating body 58 is provided between the spring element 54 and the filter element 20 and is located on the valve body 46 with axial freedom of movement. The compensating body compensates for axial tolerances of the housing and/or the filter element.

When the filter element is inserted, the valve body 46 is pressed in the closing direction via the compensating body 58 and the stronger spring element 54. On removal of the filter element 20, the compensating body 58 first moves axially upward until it hits a stop 60 on the compensating body 58. Due to the resilience of the spring element 56, the valve body 46 then moves axially upward, which opens outlet hole 42 and allows the oil in the housing 12 to drain through the outlet hole 42. The compensating body 58 is constituted as a cage-like structure so that oil can flow through it.

As is illustrated in FIG. 4, the collar 28 contains a guide 62 in the form of an opening in the region of the compensating element 58. The guide 62 guides the compensating body 58 in the axial direction and prevents deflection of the compensating body in the transverse direction. The guide 62 also serves as a stop for the retaining sections 64 extending radially outward on the compensating body 58, whose radial outer dimension is slightly greater than the diameter of the guide 62. In this way, the compensating body 58 is retained in the housing 12. When the filter element is removed, the compensating body 58 can therefore not be removed upward in the axial direction.

As is illustrated in FIG. 1, a relief-bypass valve 66 is located at the free end of the supporting tube 22 facing away from the base 26. The relief valve 66 opens if a limit pressure is exceeded so that unfiltered oil can flow from the holding space 18 via the supporting tube 30 to the oil outlet 32.

We claim:

1. An oil filter assembly having a filter element, the oil filter assembly comprising:
   a housing having a holding space for the filter element when the filter element is placed inside the housing, said housing having means for directing radial oil flow through the filter element, wherein a base of said holding space has an outlet opening;
   an outlet valve disposed at said outlet opening, said outlet valve being closed when the filter element is inserted in said housing, said outlet valve having a compensating body to compensate for axial tolerances of said housing or of the filter element; and
   a supporting tube which supports the filter element when the filter element is inserted in said housing, said supporting tube having a guide structured as an opening for guiding said compensating body outside and above said outlet opening, said guide being disposed on a foot extending radially outward or on a collar of said supporting tube extending radially outward, said supporting tube mounted to said housing in such a manner that said compensating body, guided by said supporting tube, is protected from deflection in response to transverse forces.

2. The oil filter assembly of claim 1, wherein freedom of axial movement of said compensating body is limited by said guide.

3. The oil filter assembly of claim 1, wherein said outlet valve comprises a valve body structured to move between a closed position and an open position, said valve body being pressed into said closed position by a first spring element when the filter element is inserted and being pressed into said open position by a second spring element that is weaker than said first spring element, wherein said compensating body is disposed on said valve body to move axially and is pressed against the filter element by said first spring element when the filter element is inserted.

4. The oil filter assembly of claim 1, wherein said supporting tube is inserted into said holding space and is permanently fastened and/or screw-fastened to said housing.

5. The oil filter assembly of claim 4, wherein said housing has fastening sections in a region of said base of said holding space, wherein an end of said supporting tube facing said base of said holding space has fastening regions corresponding to said fastening sections.

6. The oil filter assembly of claim 5, wherein fastening pins or pin holes that correspond to said fastening pins are provided on said fastening sections or said fastening regions.

7. The oil filter assembly of claim 6, wherein said fastening pins are constituted as rivet studs or as rivet studs for hot riveting.

8. The oil filter assembly of claim 6, wherein said fastening pins are latching pins.

9. The oil filter assembly of claim 6, wherein said fastening sections comprise threads for a fastening screw extending through fastening regions.

10. The oil filter assembly of claim 9, wherein said fastening pins have an internal or external thread for said fastening screw.

11. The oil filter assembly of claim 5, wherein said fastening sections of said housing are webs extending in an axial or radial direction, on which at least one fastening pin is located at top sides thereof, facing the filter element.

12. The oil filter assembly of claim 5, wherein said fastening regions of said supporting tube comprise feet protruding radially outward or a collar protruding radially outward that is circumferential, at least in sections.

13. The oil filter assembly of claim 1, wherein said supporting tube surrounds a retaining tube that is closed in an axial direction and radially spaced with respect to said supporting tube in a region of said base of said holding space.

14. The oil filter assembly of claim 1, wherein a free end of said supporting tube facing away from said base of said holding space comprises a relief-bypass valve.

\* \* \* \* \*